(12) United States Patent
Shimizu et al.

(10) Patent No.: US 8,218,266 B2
(45) Date of Patent: Jul. 10, 2012

(54) HEAD SLIDER

(75) Inventors: Yuki Shimizu, Ibaraki (JP); Junguo Xu, Ibaraki (JP); Jianhua Li, Kanagawa (JP); Hidekazu Kohira, Kanagawa (JP); Tetsuya Matsusaki, Kanagawa (JP); Hidetoshi Anan, Yokohama (JP)

(73) Assignee: HGST Netherlands BV, Amsterdam (NL)

( * ) Notice: Subject to any disclaimer, the term of this patent is extended or adjusted under 35 U.S.C. 154(b) by 965 days.

(21) Appl. No.: 11/899,772

(22) Filed: Sep. 7, 2007

(65) Prior Publication Data

US 2008/0170332 A1    Jul. 17, 2008

(30) Foreign Application Priority Data

Sep. 7, 2006 (JP) .................................. 2006-242687

(51) Int. Cl.
*G11B 5/60* (2006.01)
(52) U.S. Cl. .................................. 360/235.8; 360/235.5
(58) Field of Classification Search .... 360/235.1–235.3, 360/235.8–235.9, 236.3, 236.6, 237
See application file for complete search history.

(56) References Cited

U.S. PATENT DOCUMENTS

| | | | |
|---|---|---|---|
| 4,863,809 A | 9/1989 | Brar et al. | |
| 5,118,577 A * | 6/1992 | Brar et al. | 360/235.2 |
| 5,768,056 A * | 6/1998 | Boutaghou et al. | 360/235.1 |
| 5,781,377 A * | 7/1998 | Koka et al. | 360/235.1 |
| 5,851,475 A | 12/1998 | Komvopoulos et al. | |
| 6,249,403 B1 * | 6/2001 | Tokisue et al. | 360/235.2 |
| 6,252,741 B1 * | 6/2001 | Ahn | 360/235.1 |
| 6,278,582 B1 * | 8/2001 | Okawa et al. | 360/235.2 |
| 6,329,023 B2 * | 12/2001 | Tokisue et al. | 427/489 |
| 6,368,425 B1 * | 4/2002 | Segar et al. | 148/239 |
| 6,385,011 B1 * | 5/2002 | Chang et al. | 360/234.3 |
| 6,421,202 B1 * | 7/2002 | Tanaka et al. | 360/122 |
| 6,603,637 B1 * | 8/2003 | Segar et al. | 360/122 |
| 6,747,845 B1 * | 6/2004 | Baglin et al. | 360/234.3 |
| 6,961,217 B2 | 11/2005 | Kameyama et al. | |
| 7,116,521 B2 | 10/2006 | Kameyama | |
| 7,564,646 B2 * | 7/2009 | Yamamoto | 360/97.01 |

(Continued)

FOREIGN PATENT DOCUMENTS

EP          680036 A1 *   11/1995

(Continued)

OTHER PUBLICATIONS

English machine translation of JP 08-194930 A to Inoue et al., published on Jul. 30, 1996.*

(Continued)

*Primary Examiner* — Will J Klimowicz
(74) *Attorney, Agent, or Firm* — Daphne Burton; Burton IP Law Group (57) ABSTRACT

Embodiments of the present invention provide a slider that may suppress contamination from being attached to the flying surface of the slider without influence on reduction of the flying height of the slider. Ions exerting an effect of decreasing surface energy are implanted in the whole surface of a flying surface of a magnetic head slider except for a front rail surface and a center rail surface. According to this, contamination is prevented from being attached to a front step bearing surface, a side step bearing surface, a center step bearing surface and a negative pressure groove where contamination is particularly liable to be attached in the flying surface of the magnetic head slider, so as to suppress destabilization in flying of the slider.

7 Claims, 9 Drawing Sheets

U.S. PATENT DOCUMENTS

| | | | |
|---|---|---|---|
| 2001/0018094 A1 | 8/2001 | Tokisue et al. | |
| 2002/0008939 A1* | 1/2002 | Boutaghou et al. | 360/235.8 |
| 2003/0095361 A1* | 5/2003 | Shimanouchi et al. | 360/294.4 |

FOREIGN PATENT DOCUMENTS

| | | | |
|---|---|---|---|
| GB | 2351839 A * | 1/2001 | |
| JP | 62229515 A * | 10/1987 | |
| JP | 63064684 A * | 3/1988 | |
| JP | 63251981 A * | 10/1988 | |
| JP | 08-147655 | 6/1996 | |
| JP | 08194930 A * | 7/1996 | |
| WO | WO 9408334 A1 * | 4/1994 | |

OTHER PUBLICATIONS

European Patent Office (EPO) search report for patent application EP07012824 (Jan. 2, 2008).

* cited by examiner

FIG. 1 area having ions implanted
area having no ion implanted

FIG. 10 area having ions implanted area having no ion implanted

HEAD SLIDER

CROSS-REFERENCE TO RELATED APPLICATION

The instant nonprovisional patent application claims priority to Japanese Patent Application No. 2006-242687 filed Sep. 7, 2006 and which is incorporated by reference in its entirety herein for all purposes.

BACKGROUND OF THE INVENTION

In a disk device, such as a magnetic disk device, an optical disk device and a magneto-optical disk device, the information recording density can be improved with a smaller distance between the recording layer of the disk and the recording/reproducing device of the head slider. Accordingly, the flying amount of the head slider is being decreased along with improvement in information recording density of the disk device.

For example, in order to improve an information recording density of a magnetic disk, it is necessary to decrease the distance between the recording/reproducing device mounted on the magnetic head slider and the magnetic film constituted by sputtering or the like on the magnetic disk surface, so-called a magnetic spacing. In a current magnetic disk device, a DLC (diamond like carbon) protective film is constituted on the magnetic disk, and a lubricant is further coated on the DLC protective film. A DLC protective film is also constituted on a rail surface of a flying surface of the magnetic head slider. The flying height of the magnetic head slider on the magnetic disk, i.e., the distance (clearance) between the DLC protective film of the magnetic disk and the flying lowermost point of the magnetic head slider upon flying is being reduced to a level below about 10 nm in terms of design value.

In a disk device having a head slider flying at an extremely low height, there is substantially no margin on flying the head slider in consideration of fluctuation in flying height due to change in temperature and atmospheric pressure inside the disk device and around the disk device, and the like. Accordingly, occurrence of contact between the disk and the head slider due to the disturbance in temperature and atmospheric pressure is unavoidable.

The contact between the disk and the head slider in the disk device may bring about, in addition to physical breakage of the disk device (crash), attachment of the lubricant coated on the disk or contamination generated by friction between the disk and the head slider onto the flying surface of the head slider, particularly onto the step bearing surface or the negative pressure groove surface thereof. In the current magnetic disk slider, which flies on the magnetic disk with the balance between positive pressure and negative pressure generated by the flying surface of the slider, in most cases the lubricant and contamination are attached onto the step bearing surface, at which the air flow rate is decreased, and the deep groove surface, at which negative pressure is generated. In the case where the lubricant or contamination is attached onto the step bearing surface or the negative pressure groove surface, the flying amount is increased by increasing the positive pressure or decreasing the negative pressure on the air-bearing surface between the slider and the disk, and the rigidity of the air film is decreased to destabilize the flying. The destabilization in flying of the slider induces contact between the disk and slider to provide such a possibility of causing physical is breakage (crash), which may become a factor of considerably decreasing the reliability of the magnetic disk device. Accordingly, it is necessary to suppress the lubricant and contamination from being attached onto the flying surface of the head slider, particularly onto the air-bearing surface or the negative pressure groove surface thereof.

In view of the problem, there have been disclosed a technique of providing protrusions on a flying surface to decrease a contact area between a disk and a head slider, and a technique of providing a carbon protective film as a thin film having fluorine ions implanted therein, on a surface of a magnetic head slider facing a magnetic disk, whereby the friction force upon contacting is decreased to stabilize the flying of the slider, as disclosed in Japanese Patent Publication No. 8-147655 ("Patent Document 1").

The technique of implanting ions in a flying surface of a magnetic head slider has an effect of suppressing a lubricant and contamination (such as dusts) from being attached onto the magnetic head slider since lipophobicity obtained by decreasing the surface energy of the slider flying surface, as having been described above.

Figure 3:
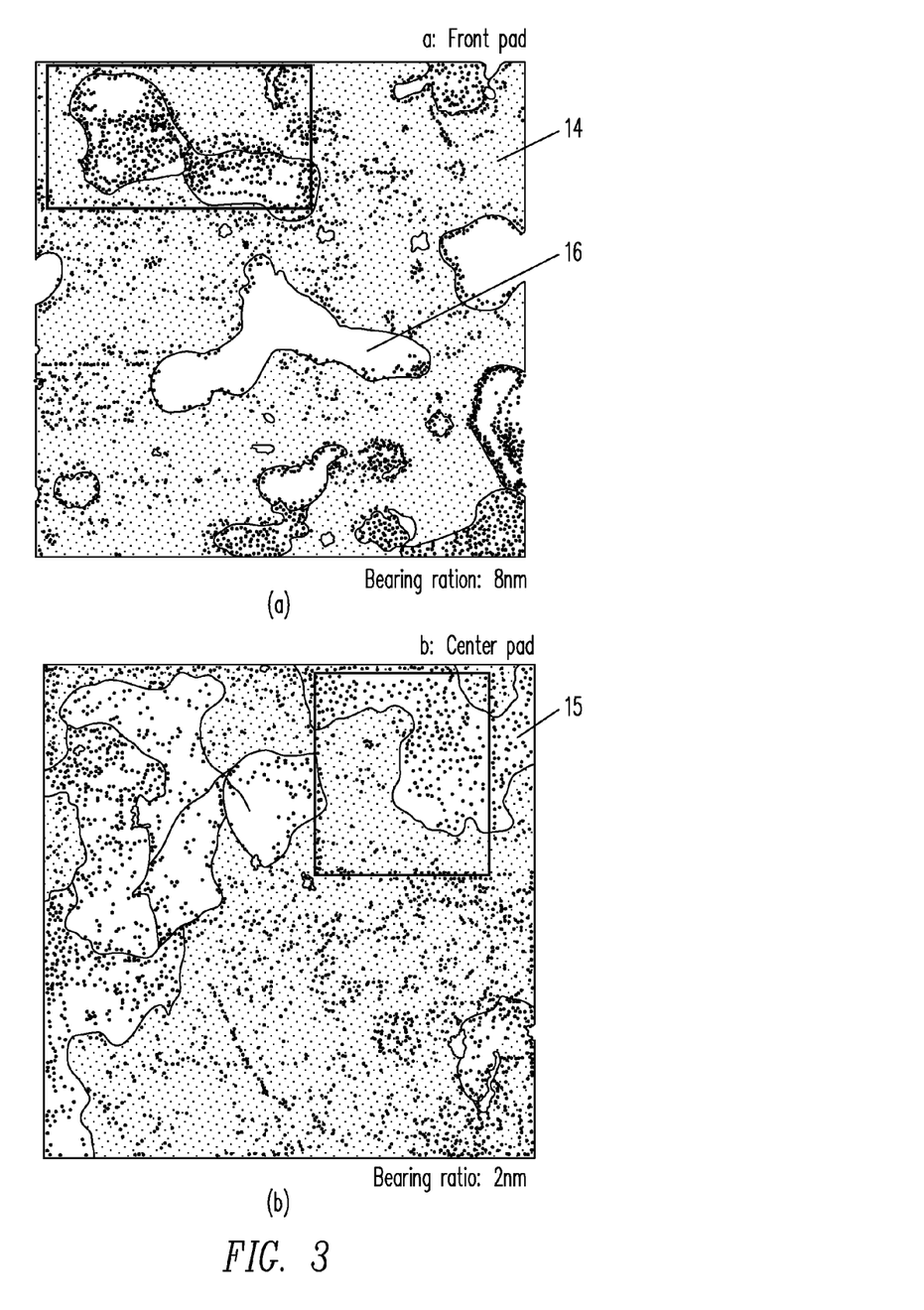
FIGS. 3(a) and 3(b) are intermolecular force micrographs (AFM images) for describing increase in surface roughness on the flying surface due to ion implantation, in which (a) is an AFM image of a front rail surface after fluorine ion implantation, and (b) is an AFM image of a center rail surface after fluorine ion implantation.

However, upon implanting fluorine ions as in Patent Document 1, the surface roughness on the flying surface of the magnetic head slider is increased. FIG. 3 shows, in the flying surface of the magnetic head slider having fluorine ions implanted therein, (a) the result 14 where the front rail surface is measured with an intermolecular force microscope (AFM) and (b) the result 15 where the center rail surface is measured with an intermolecular force microscope (AFM). In the magnetic head slider, the material of the slider part is constituted by AlTiC, and therefore, the front rail and the center rail are constituted in the AlTiC part. In FIGS. 3(a) and (b), particle boundaries of TiC particles 16, which have not been confirmed before implanting ions, are clearly confirmed. This is because the protective film on the flying surface of the slider is sputtered due to the sputtering effect of ion implantation, whereby AlTiC as an underlayer is partially exposed. The surface roughness due to the particle boundaries has a size equivalent to the flying clearance having been described above, and therefore, reduction in flying height of the head slider is impaired when the ion implantation is effected on the whole surface as in Patent Document 1.

Associated with a decrease in flying height of a magnetic head slider, there arises a problem of destabilization of flying of a slider due to attachment of contamination to a flying surface of a magnetic head slider.

BRIEF SUMMARY OF THE INVENTION

Embodiments of the present invention provide a slider that may suppress contamination from being attached to the flying surface of the slider without influence on reduction of the flying height of the slider, and a method for producing the same. Ions exerting an effect of decreasing surface energy are implanted in the whole surface of a flying surface of a magnetic head slider 1 except for a front rail surface 4 and a center rail surface 7. According to this, contamination is prevented from being attached to a front step bearing surface 5, a side step bearing surface 6, a center step bearing surface 8 and a negative pressure groove 9 where contamination is particularly liable to be attached in the flying surface of the magnetic head slider, so as to suppress destabilization in flying of the slider. The ion implantation in the whole surface of the flying surface of the magnetic head slider increases the surface roughness of the front rail surface 4 and the center rail surface 7, but in the case where ions are implanted by excepting the front rail surface 4 and the center rail surface 7 as in accordance with the embodiments of the invention, contamination may be effectively prevented from being attached to the flying surface without increase in surface roughness, whereby destabilization in flying of the slider may be suppressed.

DETAILED DESCRIPTION OF THE INVENTION

Embodiments of the present invention relate to a head slider mounted on a disk device. An object in accordance with embodiments of the invention is to provide such a slider that may suppress contamination from being attached to the flying surface of the slider without influence on reduction of the flying height of the slider, and a method for producing the same.

The head slider according to embodiments of the invention has a rail surface formed by an ion milling process or the like and a flying surface having an air-bearing surface and a deep groove surface, in which ions, such as fluorine, are implanted in the deep groove surface, a tilted part from the rail surface to the air-bearing surface, and a tilted part from the air-bearing surface to the deep groove surface.

In the head slider according to embodiments of the invention, ion implantation is effected in such a state that a resist is coated on a flying surface where ion implantation is not effected, whereby a surface having ions implanted therein and a surface having no ion implanted are selectively formed.

According to embodiments of the invention, contamination is prevented from being attached to the flying surface of the slider through the effect of decreasing surface energy exerted by the ions implanted in the flying surface of the slider, so as to prevent the flying of the slider from being destabilized, and as a result, a magnetic disk device excellent in reliability may be provided. Furthermore, the ion implantation is selectively effected to prevent the surface roughness from being changed on the surfaces that influence on the extremely low flying height, whereby the stable flying of the head slider is not influenced.

Figure 1:
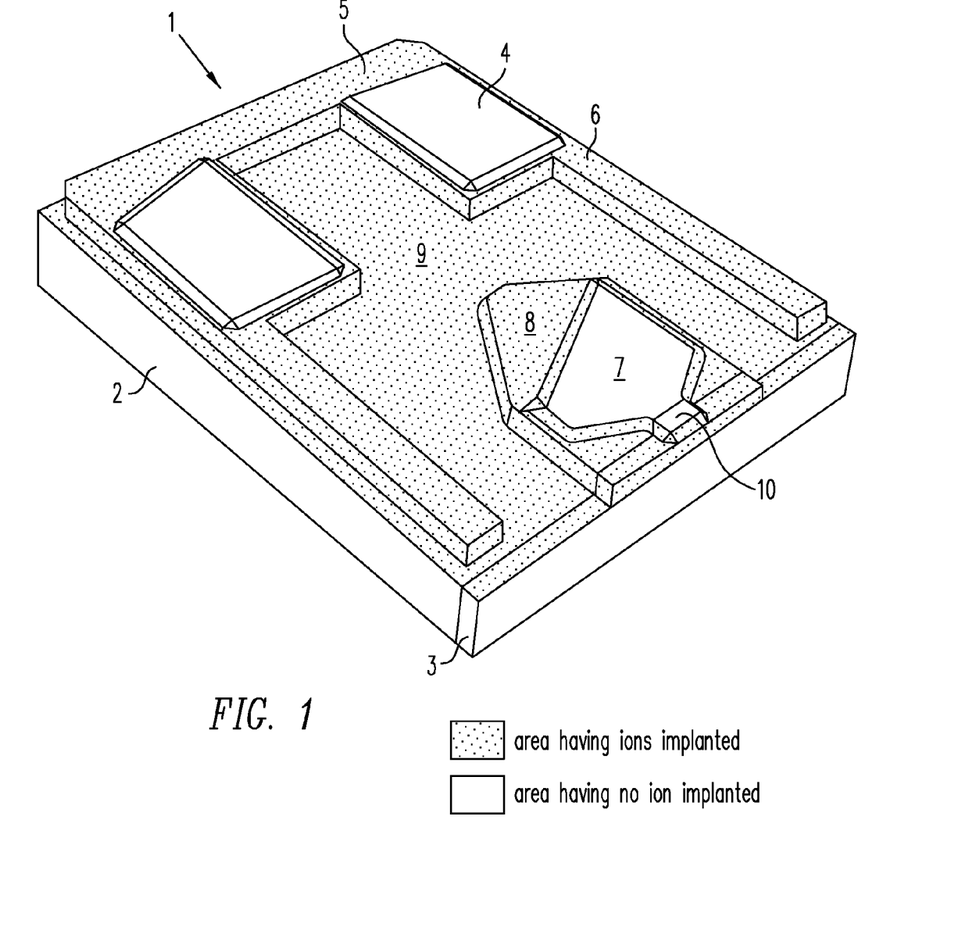
FIG. 1 is a perspective view showing the shape of the flying surface of the magnetic head slider according to Example 1 of the invention, and parts where ions are implanted therein.

A constitution of a magnetic head slider according to Example 1 of the invention of the application will be described below with reference to the drawings. FIG. 1 is a perspective view showing a flying surface of a magnetic head slider 1. The magnetic head slider 1 is constituted by a slider 2 and thin film magnetic head 3 formed on the air outflow end of the slider 2. The flying surface of the magnetic head slider 1 contains a front pad constituted by a front rail surface 4 generating a flying force (positive pressure) and a front step bearing surface 5 formed at a position lower (deeper) than the front rail surface 4 and enhancing the pressure increase on the front rail surface 4, a side step bearing surface 6 continuing from the front step bearing surface 5 to the air outflow end side at the same height (depth) as the front step bearing surface 5, a negative pressure groove 9 formed at the air outflow end side of the front pad at a deeper position than the front step bearing surface 5 and the side step bearing surface 6 and generating negative pressure, and a center pad constituted by a center rail surface 7 having the same height as the front rail surface 4, formed on the air outflow end side of the negative pressure groove 9 and generating a flying force, and a center step bearing surface 8 having the same height as the front step bearing surface 5, formed at a position lower than the center rail surface 7, and enhancing the pressure increase on the center rail surface 7.

The front rail surface 4 and the center rail surface 7 are coated with a DLC (diamond like carbon) protective film. The center rail surface 7 is formed over the slider 2 and the thin film magnetic head 3. The front pad, the center pad and the negative pressure groove 9 are formed by etching, such as ion milling described later. Accordingly, the surfaces formed between the front and center rail surfaces and the front and center step surfaces, and the surfaces formed between the front and center step surfaces and the negative pressure groove 9 may be surfaces tilted with respect to the depth direction in some cases. The recording/reproducing device (conversion device) 10 is formed in the thin film magnetic head 3 and positioned around the center of the air outflow end of the center rail surface 7.

Figure 2:
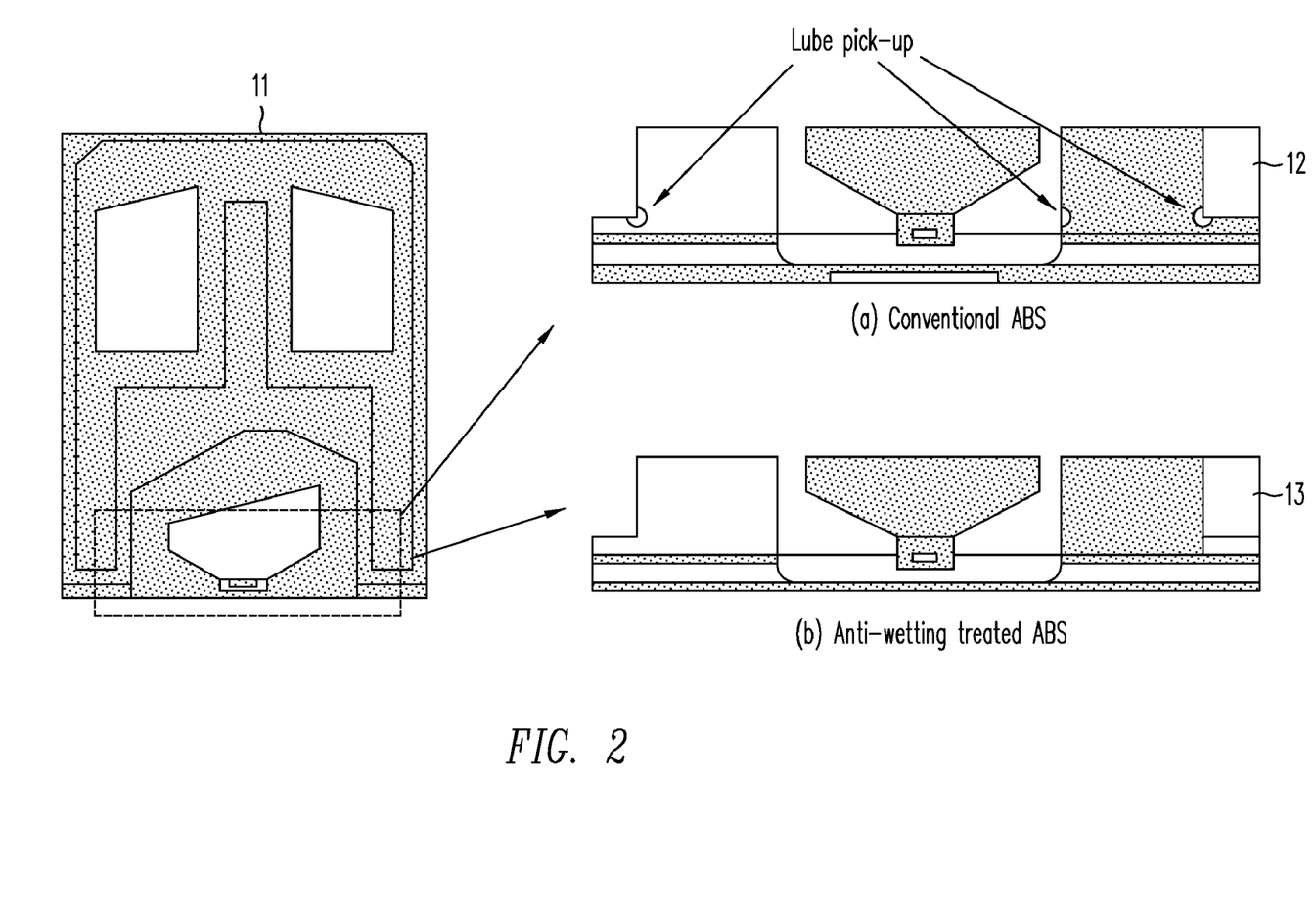
FIGS. 2(a) and 2(b) are optical micrographs near the outflow end of the flying surface of the magnetic head slider after the magnetic head slider flies above the disk for a long period of time, in which (a) is an ordinary magnetic head slider having not been subjected to a fluorine treatment, and (b) is a magnetic head slider having been subjected to a fluorine treatment.

The attachment of contamination and the like to the flying surface and the effect of the ion implantation will be described with reference to FIG. 2. FIG. 2 is an illustration showing the effect with respect to reduction in surface energy of the flying surface of the magnetic head slider in the case where a fluorine material having the same effect as the ion implantation is coated on the flying surface. The photograph in the figure is an optical micrograph of the flying surface 11 of the magnetic head slider after following a rotating magnetic disk for a long period of time, in which (a) is the flying surface 12 of the magnetic head slider having no coating, and (b) is the flying surface 13 of the magnetic head slider having the coating, both of which are images near the outflow end of the flying surface of the magnetic head slider. On the flying surface of the magnetic head slider having no coating, attachments, which are assumed to be a lubricant, are confirmed on the negative pressure groove in contact with the bearing surface, but no attachment is confirmed on the surface of the magnetic head slider having the coating. It is apparent from the result that reduction in surface energy of the magnetic head slider is effective for suppression of attachment of contamination.

Since the parts where the attachment, such as a lubricant, is attached are mainly the negative pressure groove in contact with the bearing surface, particularly the boundary between the negative pressure groove and the center pad, and the boundary between the negative pressure groove and side step bearing surface 6, contamination may be suppressed from being attached to the flying surface of the magnetic head slider by implanting ions exerting the effect of reducing surface energy in the whole surface of the flying surface of the magnetic head slider except for the front rail surface and the center rail surface.

Other positions where contamination is attached than the aforementioned parts are almost the negative pressure groove generating negative pressure upon flying the magnetic head slider, or the front step bearing surface, the side step bearing surface and center step bearing surface, at which the air flow rate is decreased, and in rare cases contamination is attached onto the rail surfaces. Accordingly, the ion implantation onto the surface other than the rail surfaces provides a sufficient effect of suppressing attachment of contamination. The surface roughness of the rail surfaces is not increased since ions are not implanted in the rail surfaces, and therefore, the extremely low flying height of the head slider is not influenced.

While the three-pad flying surface including two front pads and one center pad is described in Example 1, the flying surface may have a larger number of pads. While the flying surface having been processed to have two steps including the bearing surface and the deep groove surface is described, the flying surface may be processed to have a larger number of steps.

Figure 4:
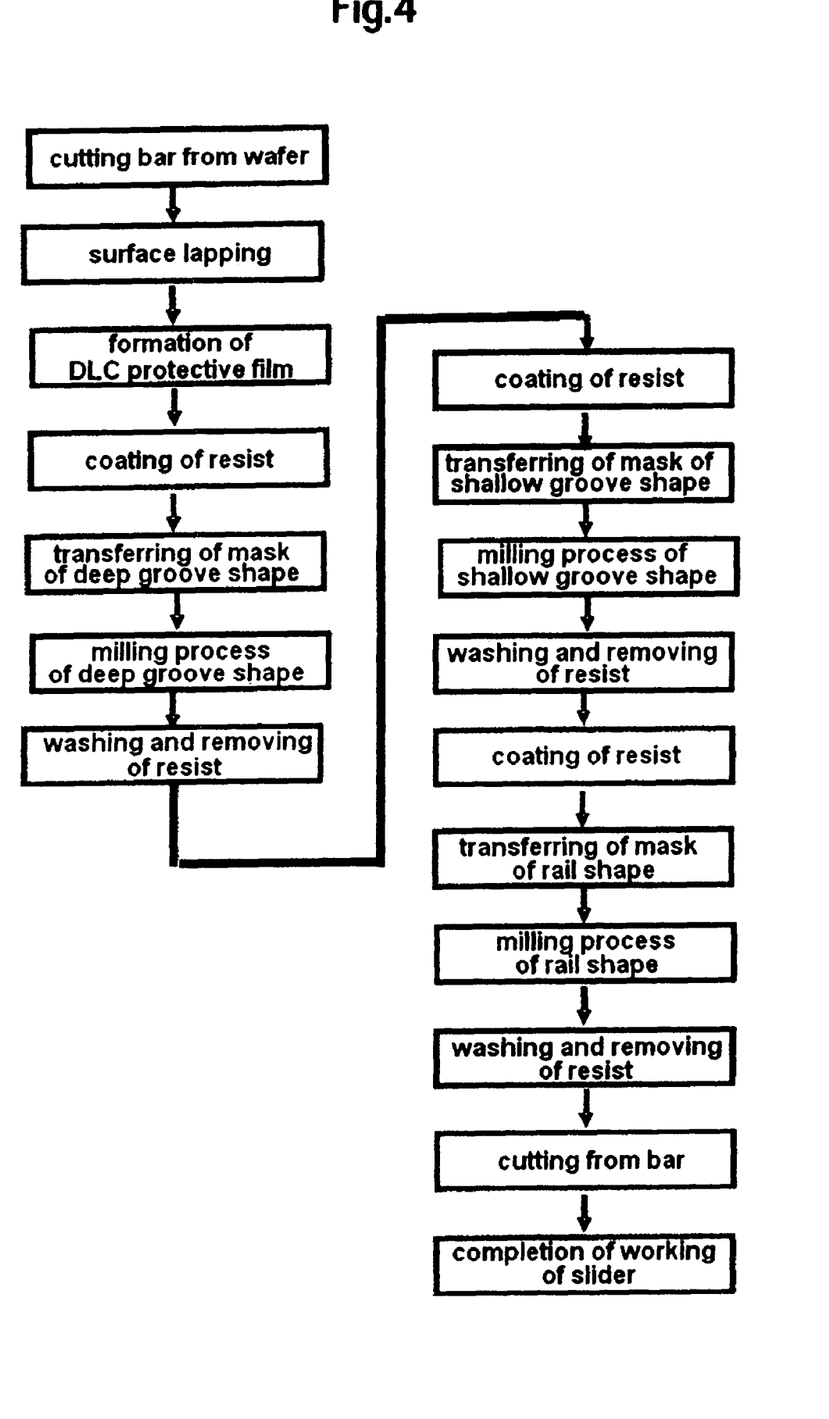
FIG. 4 is an illustration showing an example of the process steps for working the slider.
Figure 5:
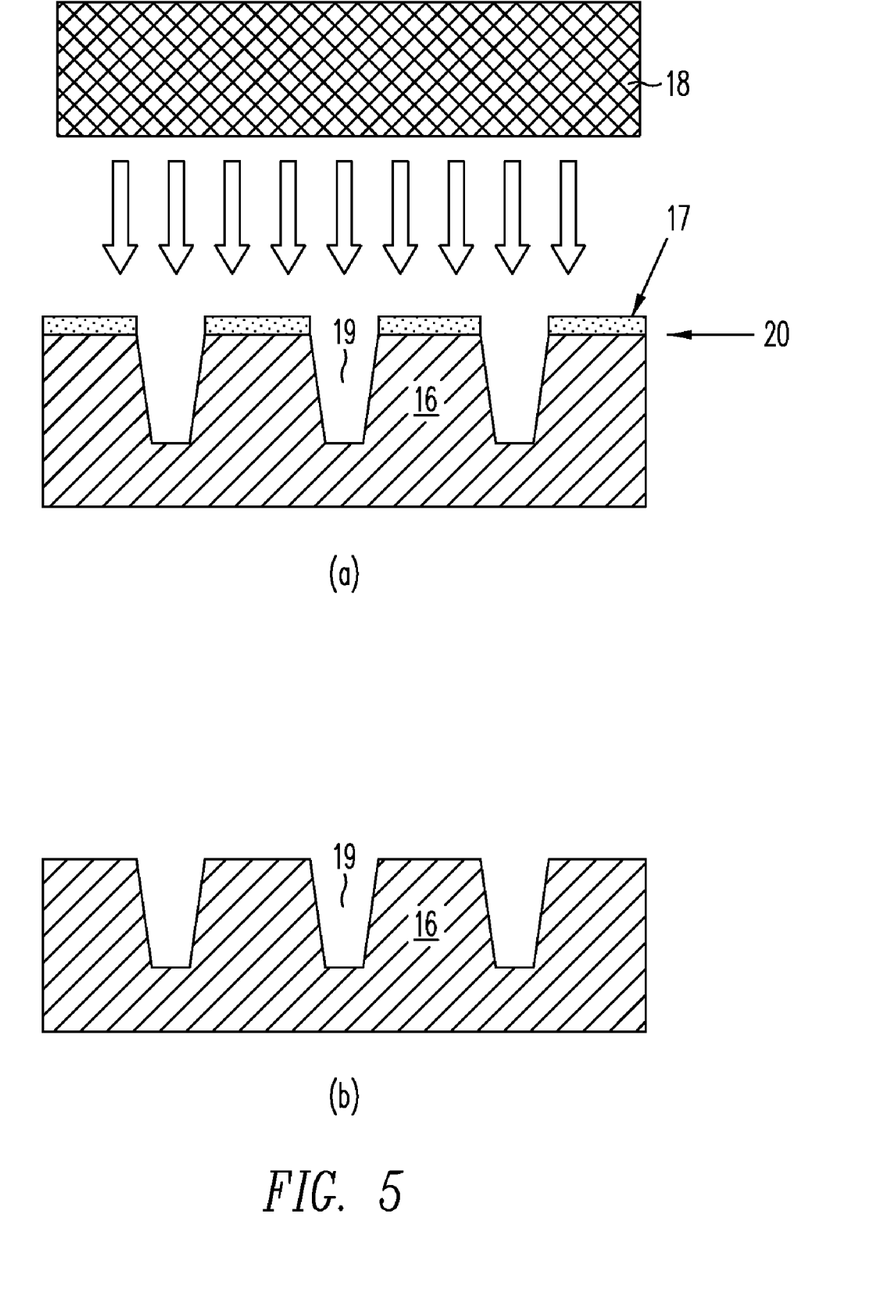
FIGS. 5(a) and 5(b) are illustrations for describing an example of a working method of a flying surface of a magnetic head slider, in which (a) is a schematic illustration of working of the groove by ion milling, and (b) is a schematic illustration of working of the groove after removing the resist.

For partially implanting fluorine ions in the flying surface of the slider, the ion implantation to the desired part may be realized without increase in cost by incorporating the fluorine ion implantation step into the process for working the shape of the flying surface of the slider. FIG. 4 shows an example of the process steps for working the slider. After forming recording/reproducing devices on an AlTiC wafer, sliders aligned in a strip form are cut as bars from the wafer. Thereafter, the bar is subjected to surface lapping for obtaining planar surface for the flying surface, and a carbon protective film is formed. Then, the shape of the flying surface of the slider is worked. In the working of the shape of the flying surface, a sequence of operations, which include coating a resist, transferring a mask by lithography, forming a groove by ion milling or reactive etching, and removing the resist after forming the groove, is repeatedly carried out corresponding to the number of steps in working the groove. In FIG. 4, three steps of grooves are worked including the deep groove (negative pressure surface 9), the shallow groove (step bearing surface) and the rail (rail surface). FIG. 5 is a schematic illustration upon working the groove, in which the parts where the resist is removed by coating the resist and transferring the mask are ground by ion milling or reactive etching as shown in FIG. 5(a), but the parts having the resist fixed thereto are protected, and a groove is formed as a result, whereby the desired groove shape shown in FIG. 5(b) is obtained after washing out the resist.

Figure 6:
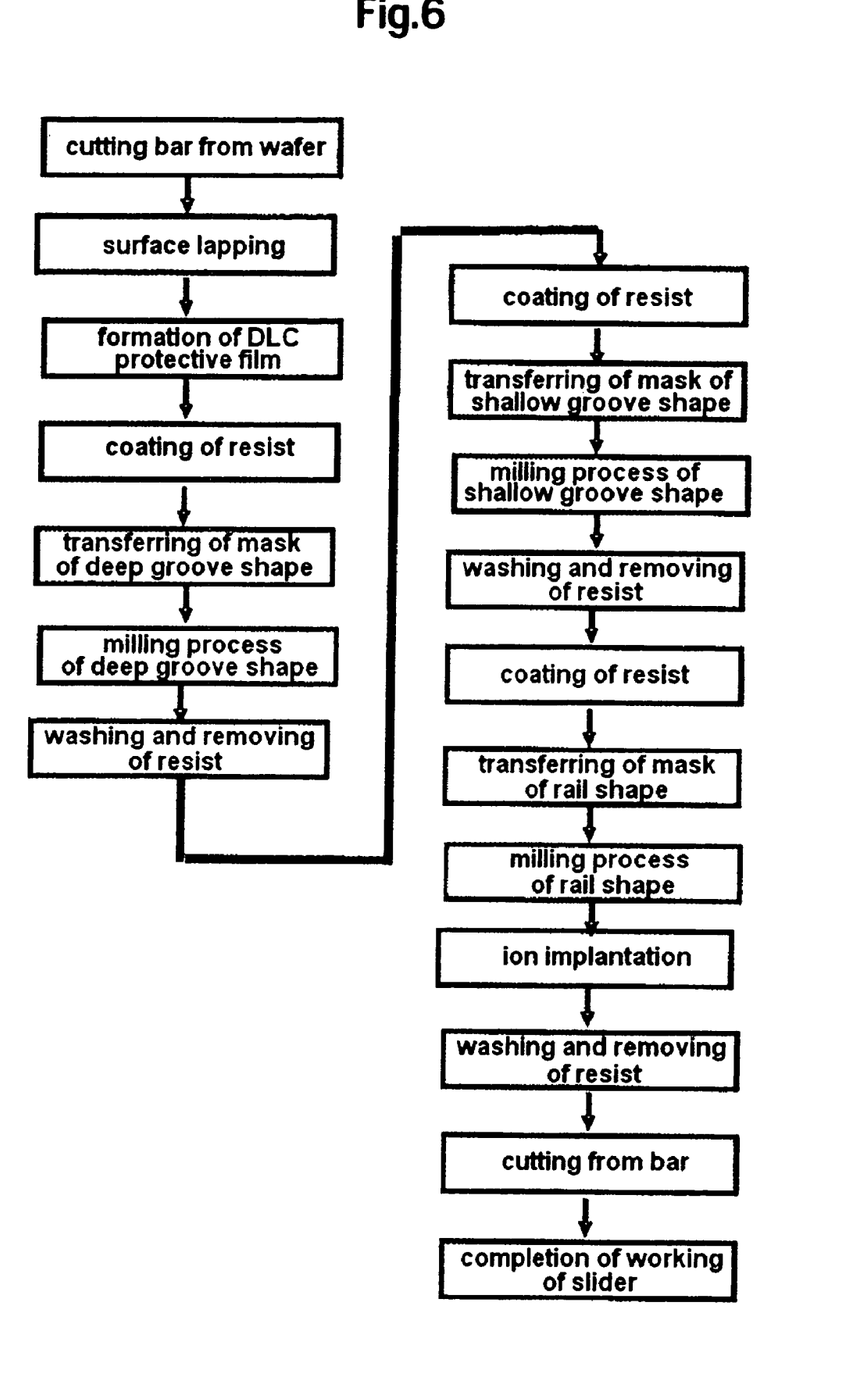
FIG. 6 is an illustration showing an example of a working sequence of the flying surface of the magnetic head slider, having a fluorine ion implantation step incorporated therein.
Figure 7:
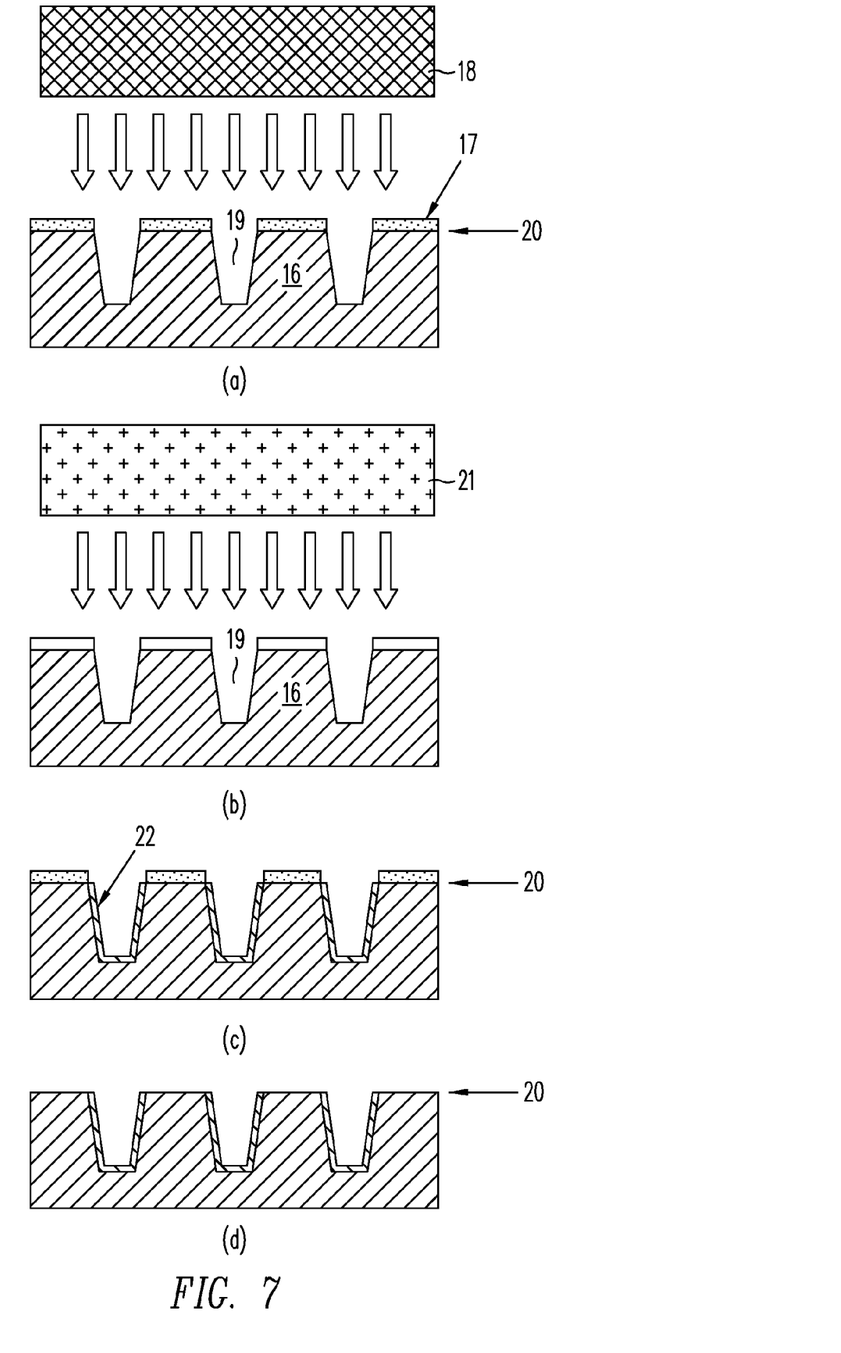
FIG. 7 These are illustrations for describing an example of a method of implanting fluorine ions to surfaces other than rail surface in the flying surface of the magnetic head slider, in which (a) is a schematic illustration showing working of the groove by ion milling, (b) is a schematic illustration showing ion implantation in the worked groove surface, (c) is a schematic illustration showing the surface after ion implantation, and (d) is a schematic illustration showing the surface where the resist on the flying surface is removed.

FIG. 6 shows an example of a slider working sequence having a fluorine ion implantation step incorporated therein. In order to realize ion implantation to a desired part without increase in cost, it is considered that it is effective to incorporate the ion implantation step into a conventional slider working sequence. The working process itself of the shape of the flying surface has been described with reference to FIG. 4, and as shown in FIG. 6, after carrying out working of the groove by ion milling or reactive etching to the rail shape, fluorine ions are implanted before washing and removing the resist. FIG. 7 is a schematic illustration of the aspect of ion implantation. After working the grooves by ion milling or reactive etching after resist-patterning as shown in FIG. 7(a), fluorine ions or the like are implanted with the patterned resist 17 remaining on the slider rail surface 20. While the slider rail surface 20 protected with the resist are protected, a layer 22 containing fluorine and having a function of suppressing contamination from being attached is formed on the bottom surface and side surface of the milling groove 19. (c) and (d) are illustrations showing the states of worked surface having the patterned resist removed therefrom, and thus the ion implantation on the other parts than the rail surface may be effected through the aforementioned steps.

As having been described, according to the example, contamination may be suppressed from being attached to the flying surface of the magnetic head slider without increase in surface roughness of the center rail surface in the flying surface of the magnetic head slider.

Figure 8:
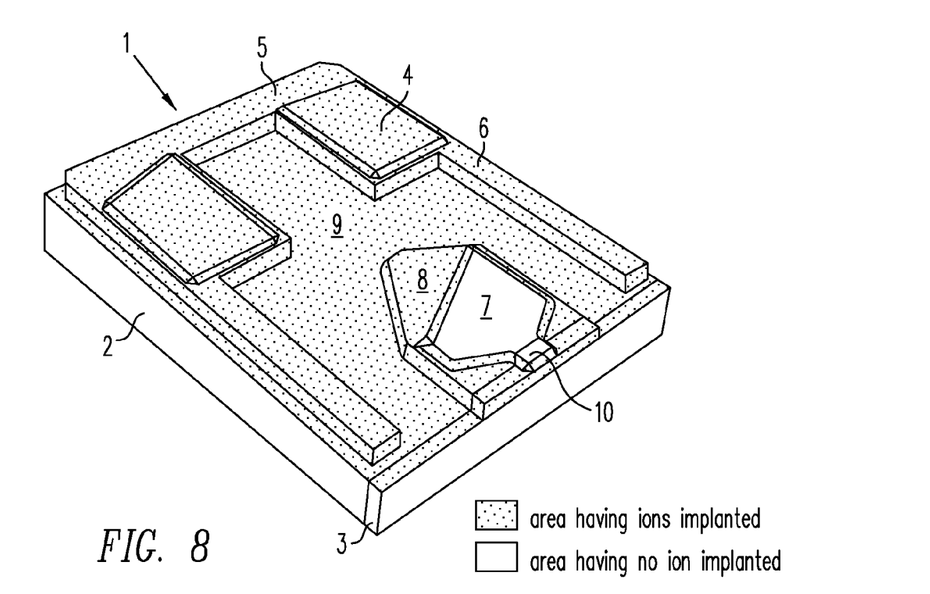
FIG. 8 is a perspective view showing the shape of the flying surface and the parts where ions are implanted of the magnetic head slider according to Example 2 of the invention.

A constitution of a magnetic head slider according to Example 2 of an embodiment of the present invention will be described below with reference to the drawings. FIG. 8 is a perspective view showing a flying surface of a magnetic head slider 1. The basic constitution thereof is the same as in Example 1, but it is different from Example 1 in such a point that ions are also implanted in the front rail surface 4. In general, the front rail surface is not in contact with the disk surface upon flying the slider owing to the flying posture with an attack angle (pitch angle), and the surface roughness of the front rail does not influence. Accordingly, there is such a possibility that increase in surface roughness on the front rail surface due to ion implantation is allowed, and thus the ion implantation area of Example 2 may be considered.

In the production process shown in FIG. 6, only the resist on the front rail surface is removed before the ion implantation, or washing and removing the resist, coating a resist and transferring a mask on the center rail surface are carried out before the ion implantation, whereby the magnetic head slider of Example 2 may be produced.

While the three-pad flying surface including two front pads and one center pad is described in the example, the flying surface may have a larger number of pads. While the flying surface having been processed to have two steps including the bearing surface and the deep groove surface is described, the flying surface may be processed to have a larger number of steps.

For example, in the case where a step is formed in the front rail, it is possible that ions are not implanted in the surface generating positive pressure, i.e., the whole surface of the front rail including the part having the step, as similarly to Example 1, or it is also possible that ions are not implanted in a part in the front rail that protrudes on the nearest side to the medium, but ions are implanted in the tilted surface with the step and the rail surface secondly nearest to the medium.

Figure 9:
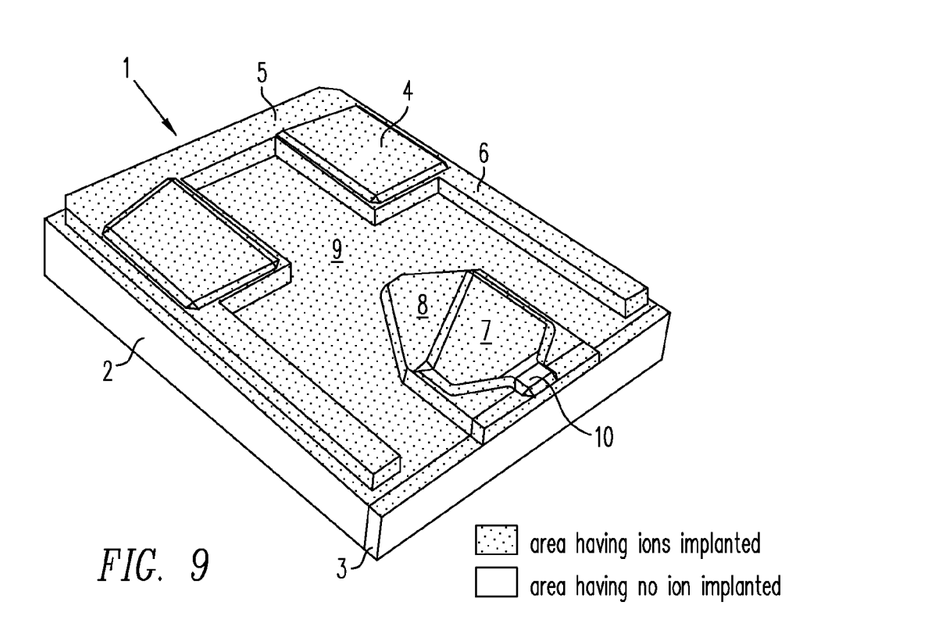
FIG. 9 is a perspective view showing the shape of the flying surface and the parts where ions are implanted of the magnetic head slider according to Example 3 of the invention.

A constitution of a magnetic head slider according to Example 3 of an embodiment of the present invention will be described below with reference to the drawings. FIG. 9 is a perspective view showing a flying surface of a magnetic head slider 1. The basic constitution thereof is the same as in Examples 1 and 2, but it is different from Examples 1 and 2 in such a point that ions are implanted in the front rail surface 4, and furthermore, ions are also implanted in a part of the center rail surface 10 near the outflow end of the slider, for example, the center rail surface except for the thin film magnetic head 3, or a part thereof except for an area of the outflow end side with respect to the side of the outflow end of the side step bearing surface 6. In general, the front rail surface is not in contact with the disk surface upon flying the slider owing to the flying posture with an attack angle, and the surface roughness of the front rail does not influence. In the center rail, the part having a high possibility of being in contact with the disk is a part near the outflow end of the slider. Therefore, there is such a possibility that increase in surface roughness due to ion implantation on the front rail surface 4 and a part of the center rail surface 10 except for a part near the outflow end of the slider is allowed, and thus the ion implantation area of Example 3 may be considered. The head slider of the example may be produced in the same manner as in Example 2. While the three-pad flying surface including two front pads and one center pad is described in the example, the flying surface may have a larger number of pads. While the flying surface having been processed to have two steps including the bearing surface and the deep groove surface is described, the flying surface may be processed to have a larger number of steps.

Figure 10:
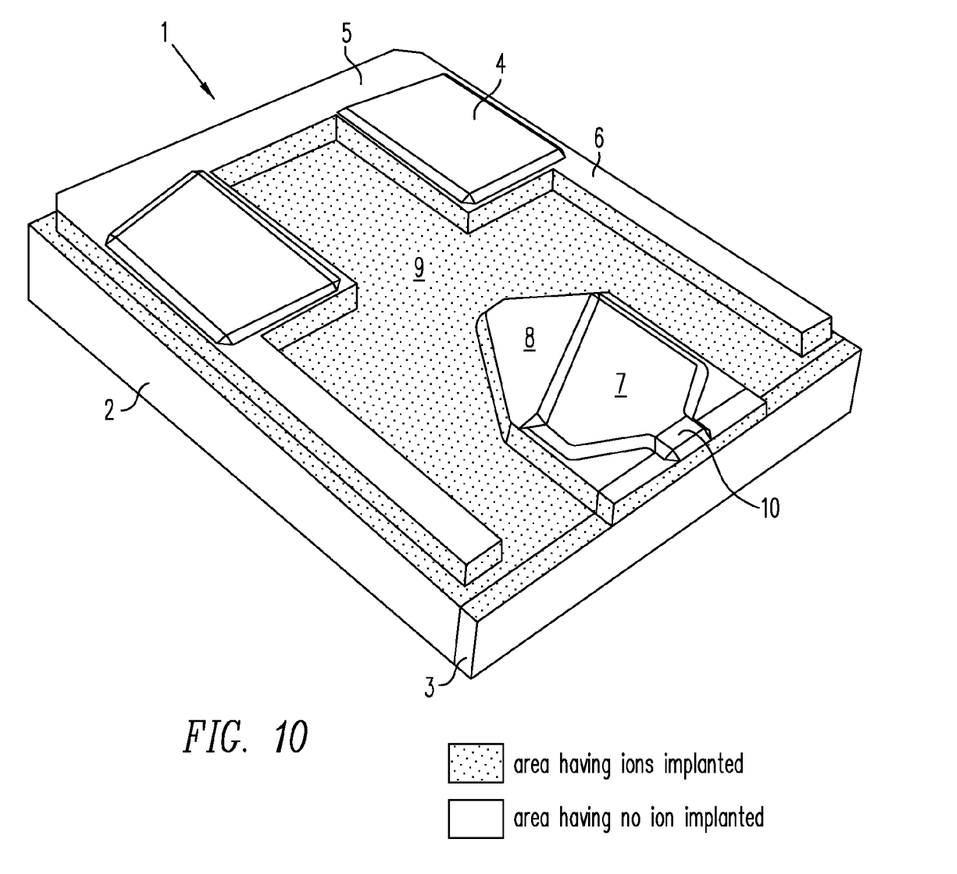
FIG. 10 is a perspective view showing the shape of the flying surface and the parts where ions are implanted of the magnetic head slider according to Example 4 of the invention.

A constitution of a magnetic head slider according to Example 4 of an embodiment of the present invention will be described below with reference to the drawings. FIG. 10 is a perspective view showing a flying surface of a magnetic head slider 1. The basic constitution thereof is the same as in Example 1, but it is different from Example 1 in such a point that the surfaces having ions implanted therein include the negative pressure groove surface 9, the front step bearing surface 5, the side step bearing surface 6, and the tilted surface from the center step bearing surface 8 to the negative pressure groove surface 9. The negative pressure groove 9 generates air negative pressure upon flying the magnetic head slider, contamination is liable to be attached to the negative pressure groove 9 and the tilted surface from the negative pressure groove 9 to the step bearing surface, as described with reference to FIG. 2. Accordingly, the ion implantation area of Example 4 may be considered.

In the production process shown in FIG. 6, washing and removing the resist, coating a resist and transferring a mask on the rail surfaces and the step surfaces are carried out before the ion implantation, whereby the magnetic head slider of Example 4 may be produced.

While the three-pad flying surface including two front pads and one center pad is described in the example, the flying surface may have a larger number of pads. While the flying surface having been processed to have two steps including the bearing surface and the deep groove surface is described, the flying surface may be processed to have a larger number of steps.

What is claimed is:

1. A head slider comprising a rail surface having a protective film formed on a surface thereof, a step bearing surface formed at a position deeper than the rail surface, and on a surface separate from the rail surface, a negative pressure groove surface having ions implanted in substantially the entire negative pressure groove surface, the negative pressure groove surface being formed at a position deeper than the step bearing surface, wherein the rail surface does not have ions implanted, the step bearing surface is located in a plane substantially parallel to but vertically offset from the rail surface, wherein ions are implanted in substantially the entire step bearing surface.

2. The head slider as described in claim 1, wherein only the negative pressure groove surface and the step bearing surface have ions implanted therein.

3. The head slider as described in claim 1, wherein the step bearing surface, and a step surface between the step bearing surface and the rail surface have ions implanted therein.

4. The head slider as described in claim 1, wherein the implanted ions are ions that lower surface energy of a surface having the ions implanted therein.

5. The head slider as described in claim 1, wherein the implanted ions are fluorine ions or nitrogen ions.

6. A head slider comprising a front rail surface provided on an air inflow end side, a front step bearing surface formed on an air inflow end side of the front rail surface, a negative pressure groove surface formed at a position deeper than the front step bearing surface, the negative pressure groove surface having ions implanted in substantially the entire negative pressure groove surface, a center rail surface provided with a conversion device and provided on an air outflow end side with respect to the front rail surface, and a center step bearing surface formed on an air inflow end side of the center rail surface, the center rail surface having a protective layer formed thereon, and other surfaces than the center rail surface and the front rail surface having ions implanted therein, wherein the negative pressure groove surface is a surface separate from any rail surface, the front step bearing surface is formed at a position deeper than the front rail surface, and the front step bearing surface is located in a plane substantially parallel to but vertically offset from the front rail surface, wherein ions are implanted in substantially the entire front step bearing surface, the center step bearing surface is formed at a position deeper than the center rail surface, and the center step bearing surface is located in a plane substantially parallel to but vertically offset from the center rail surface, wherein ions are implanted in substantially the entire center step bearing surface.

7. The head slider as described in claim 6, wherein the negative pressure groove surface of the head slider is configured to be substantially parallel with a magnetic disk surface during operation.

* * * * *